(12) United States Patent
Xu (10) Patent No.: US 10,906,161 B2
(45) Date of Patent: Feb. 2, 2021

(54) CONNECTION AND TORQUE TRANSFER APPARATUS, ACCESSORY, AND USE THEREOF

(71) Applicant: Boning Xu, Shanghai (CN)

(72) Inventor: Boning Xu, Shanghai (CN)

( * ) Notice: Subject to any disclaimer, the term of this patent is extended or adjusted under 35 U.S.C. 154(b) by 320 days.

(21) Appl. No.: 16/212,680

(22) Filed: Dec. 7, 2018

(65) Prior Publication Data

US 2019/0232470 A1    Aug. 1, 2019

(30) Foreign Application Priority Data

Jan. 26, 2018 (CN) .......................... 2018 1 0076330
Jan. 26, 2018 (CN) ...................... 2018 2 0133368 U
Jul. 5, 2018 (CN) ...................... 2018 2 1064493 U (51) Int. Cl.
  *B25B 23/00* (2006.01)
  *B25B 21/00* (2006.01)

(52) U.S. Cl.
  CPC ........ *B25B 23/0035* (2013.01); *B25B 21/002* (2013.01)

(58) Field of Classification Search
  CPC . B25B 23/0035; B25B 23/14; B25B 23/1405; B25B 23/141; B25B 21/002
  See application file for complete search history.

(56) References Cited

U.S. PATENT DOCUMENTS 3,779,105 A  * 12/1973  Triplett ............... B25B 27/0007
                                                   81/124.5
2015/0096778 A1*  4/2015  Schneider ................. B25F 3/00
                                                   173/213

* cited by examiner

*Primary Examiner* — David B. Thomas (57) ABSTRACT

The present disclosure provides a connection and torque transfer apparatus having a torque input end and a torque output end electrically insulated, an accessory and use thereof. The connection and torque transfer apparatus comprises at least: a torque input component, an intermediate body component, and a torque output component; and the accessory can match the foregoing apparatus to form an assembly. The apparatus has a few components, high reliability, good insulating performance, excellent torque transfer performance and low costs, and is simple and convenient to manufacture.

22 Claims, 7 Drawing Sheets

CONNECTION AND TORQUE TRANSFER APPARATUS, ACCESSORY, AND USE THEREOF

The present application claims the priority to Chinese Patent Application No. CN201820133368.9, filed on Jan. 26, 2018, the priority to Chinese Patent Application No. CN201810076330.7, filed on Jan. 26, 2018, the priority to Chinese Patent Application No. CN201821064493.5, filed on Jul. 5, 2018, and the priority to Japanese Patent Application No. JP2018-003067, filed on Aug. 8, 2018, all of which are hereby incorporated by reference in their entireties.

TECHNICAL FIELD

The present disclosure relates to a connection and torque transfer apparatus, belongs to the mechanical field, and in particular, relates to a connection and torque transfer apparatus having a torque input end and a torque output end electrically insulated, and an accessory that are applied to a plurality of reliably-grounded electric tools for screwing down a bolt and a nut and that are mounted between a tool head such as a sleeve or a screwdriver set head and a tool body, when bolts and nuts in different phases of an alternating current circuit or at positive and negative terminals of a direct current circuit and different potential points need to be safely screwed down or screwed off at the same time.

BACKGROUND

For an existing tool for screwing down a bolt and a nut, generally, a tool head such as a sleeve or a screwdriver set head is directly connected to a convex square torque output interface of a tool body by using a concave square torque input interface of the tool head, and some tool heads such as a screwdriver set head may also be connected to the convex square torque output interface of the tool body by using a connecting piece wholly made of a metal material. During screwing down or screwing off electriferous bolts and nuts, an electrical insulation protection means is that a handle of a tool or a holding part is wrapped by an insulating material layer, to avoid an electric shock when a user holds the tool.

It is increasingly popular that in mass assembling and production, electric screwing tools powered by commercial wired power supply are used. In a process of screwing down or screwing off electriferous bolts and nuts, there is a risk that a grounding system through a wired electric screwing tool is short circuited to the ground. In a process of simultaneously screwing down or screwing off bolts and nuts at positive and negative terminals in an electriferous direct current circuit and bolts and nuts at different potential points that are not commonly grounded to the wired electric screwing tool, there is a risk that the grounding system through the wired electric screwing tool forms a short circuit loop.

In a process of assembling a high-voltage power battery assembly of a new-energy vehicle, a process arrangement of simultaneously screwing down or screwing off electriferous bolts and nuts at different potential points and at positive and negative electrodes of a same battery unit can be improve efficiency doubled and redoubled, and reduce deployments of assembly lines for assembling and production. However, the problem that the grounding system through the wired electric screwing tool forms a short circuit loop needs to be resolved. A connection and torque transfer apparatus having a torque input end and a torque output end electrically insulated is necessary for resolving the foregoing short circuit problem.

Currently, an existing particular connection and torque transfer apparatus having a torque input end and a torque output end electrically insulated has poor product performance and reliability, a complex structure and high costs, and is easily damaged.

SUMMARY

In view of the disadvantages in the prior art, an objective of the present disclosure is to provide a connection and torque transfer apparatus having a torque input end and a torque output end electrically insulated, an accessory and use thereof, to resolve the problems that a connection and torque transfer apparatus in the prior art has poor performance and reliability and a complex structure, and a wired electric screwing tool and an electric screwing machine cannot simultaneously screw down or screw off bolts and nuts at a plurality of potential points.

To achieve the foregoing objectives and other related objectives, the present disclosure provides a connection and torque transfer apparatus having a torque input end and a torque output end electrically insulated, and the apparatus includes at least:

a torque input component, an intermediate body component, and a torque output component, where a body of the torque input component is cylindrical, a concave square torque input interface is disposed on a top end, and torque active-transfer teeth or a torque active-transfer tenon are/is disposed on a bottom end; a body of the torque output component is cylindrical, torque passive-transfer teeth or a torque passive-transfer mortise are/is disposed on a top end, and a torque output interface is disposed on a bottom end; and a body of the intermediate body component is cylindrical and is made of an insulating material, so that the torque input component is not in contact with and is electrically insulated from the torque output component; and first tooth grooves matching the torque active-transfer teeth are disposed on one end of the intermediate body component and second tooth grooves matching the torque passive-transfer teeth are disposed on the other end; or an intermediate body mortise matching the torque active-transfer tenon is disposed on one end of the intermediate body component and an intermediate body tenon matching the torque passive-transfer mortise is disposed on the other end.

The foregoing three separate components are combined in a cooperative manner (that is, an axis core) to work together.

The body of the torque input component and the body of the torque output component are cylindrical. Therefore, the bottom end and the top end are surfaces of two ends of a cylinder.

That the torque active-transfer teeth match the first tooth grooves means that the torque active-transfer teeth can be exactly inserted into the first tooth grooves.

That the torque passive-transfer teeth match the second tooth grooves means that the torque passive-transfer teeth can be exactly inserted into the second tooth grooves.

That the torque active-transfer tenon matches the intermediate body mortise means that the torque active-transfer tenon can be exactly inserted into the intermediate body mortise. That the torque passive-transfer mortise matches the intermediate body tenon means that the intermediate body tenon can be exactly inserted into the torque passive-transfer mortise.

Preferably, the concave square torque input interface is located at a center of a top end.

Preferably, a teeth surface of the torque active-transfer teeth is planar or curved.

Preferably, the torque active-transfer teeth are symmetrically distributed at a bottom end of the torque input component.

Preferably, the number of the torque active-transfer teeth is at least two.

Preferably, a first flange is disposed on a bottom end of the body of the torque input component, and the first flange surrounds a periphery of the bottom end.

Preferably, a cross-section of the torque active-transfer tenon is non-circular.

Preferably, the torque output interface is located at a center of a bottom end.

Preferably, a teeth surface of the torque passive-transfer teeth is planar or curved.

Preferably, the torque passive-transfer teeth are symmetrically distributed at a top end of the torque output component.

Preferably, the number of the torque passive-transfer teeth is at least two.

Preferably, a second flange is disposed on the top end of the body of the torque output component, and the second flange surrounds a periphery of the top end.

Preferably, a cross-section of the torque passive-transfer mortise is non-circular. For example, the cross-section may be of a shape such as a triangle or a quadrangle.

Preferably, the diameter of the intermediate body component is less than the diameter of the torque input component and the diameter of the torque output component, a convex ring is disposed on an outer periphery of the cylindrical body of the intermediate body component, and the convex ring is annular and surrounds a circumference of the cylindrical.

More preferably, the outer diameter of the convex ring is the same as the diameter of the torque input component and the diameter of the torque output component. In this way, the three parts are combined together, and can closely cooperate with each other and form a cylinder having a same outer diameter.

A method for manufacturing the foregoing connection and torque transfer apparatus is that: the torque input component, the intermediate body component and the torque output component are designed to be in slight interference fit and assembled through press fitting; or the torque input component and the torque output component are clamped on process equipment to maintain correct postures relative to each other, and the intermediate body component is directly manufactured between the torque input component and the torque output component by using a process such as casting or injection molding.

Further, an accessory of the connection and torque transfer apparatus further includes: a barrel-shaped housing with two ends open and an insulating sleeve with two ends open, where the sleeve can be exactly sheathed in the housing; one end of the housing is a free end and the other end is a connecting and mounting end; when the sleeve is disposed in the housing, one end located in the housing is an inner end, and the other end is an outer end; and the outer end is flush with the free end of the housing or protrudes from the free end; a first positioning portion is disposed in the housing, and the first positioning portion is used for positioning an external input end bearing; and a second positioning portion is disposed in the sleeve, and the second positioning portion is used for positioning an external output end bearing.

Further, the connection and torque transfer apparatus formed by the torque input component, the intermediate body component, and the torque output component can be exactly disposed in the accessory as an axis core.

The connecting and mounting end can be connected to a screwing shaft body of a screwing machine.

When the sleeve is sheathed in the housing, the sleeve forms an inner lining of the housing.

Preferably, the first positioning portion are a first positioning step surrounding an inner wall of the housing and a housing positioning groove, and the external input end bearing can be exactly disposed between the first positioning step and the housing positioning groove. When the input end bearing is mounted in the housing, the input end bearing exactly abuts against the first positioning step.

Preferably, the second positioning portion is a second positioning step surrounding an inner wall of the sleeve. When the output end bearing is mounted in the sleeve, the output end bearing exactly abuts against the second positioning step.

Preferably, a third positioning portion used for positioning the sleeve is further disposed in the housing.

Preferably, the third positioning portion is a third positioning step surrounding the inner wall of the sleeve. When the sleeve is inserted into the housing, one end of the sleeve (that is, an inner end face) exactly abuts against the third positioning step.

Preferably, a flange is disposed on the connecting and mounting end of the housing, and a screw hole is provided on the flange.

More preferably, there are two screw holes.

Preferably, a flange is formed on an outer end face of the sleeve, and the flange completely wraps the free end of the housing. A main objective of the flange is to enable the free end of the housing to be insulated from the inner components.

Preferably, the accessory further includes an input end bearing, and the input end bearing can be exactly sheathed in the housing.

Preferably, the accessory further includes an elastic outer snap ring, and the elastic outer snap ring matches the housing positioning groove.

That the elastic outer snap ring matches the housing positioning groove means that the elastic outer snap ring can be exactly disposed in the housing positioning groove and protrudes from the housing positioning groove. In this way, when the input end bearing is mounted in the housing, the input end bearing is fixed, so that the input end bearing does not fall off from the housing.

Preferably, the accessory further includes an elastic inner snap ring, an axis core positioning groove surrounding the torque input component is disposed on the torque input component, and the elastic inner snap ring matches the axis core positioning groove.

That the elastic inner snap ring matches the axis core positioning groove means that the elastic inner snap ring can be exactly disposed in the axis core positioning groove. A main objective is to fix the axis core.

Preferably, the accessory further includes an output end bearing, and the output end bearing can be exactly sheathed in the sleeve.

Further, the output end bearing is in interference fit with the sleeve, and therefore does not fall off.

Preferably, first inspection windows are disposed on the housing; and second inspection windows are disposed at corresponding positions on the sleeve. This means that when the sleeve is sheathed in the housing, the first inspection windows and the second inspection windows overlap, and a worker can inspect inner components by using the first inspection windows and the second inspection windows.

More preferably, the first inspection windows are evenly distributed on the housing, and the second inspection windows are evenly distributed on the sleeve.

More preferably, there are two first inspection windows and two second inspection windows.

More preferably, the first inspection windows and the second inspection windows are of a same shape.

Preferably, the housing is made of steel. Certainly, the housing may be made of other metal materials or alloy.

Preferably, the sleeve is made of an insulating material.

More preferably, the insulating material may be an engineering plastic such as ABS, PVC, or phenolic resin (bakelite).

Other aspect of the present disclosure provides a connection and torque transfer shaft assembly having a torque input end and a torque output end electrically insulated (a transmission shaft assembly for short), where the assembly includes an axis core formed by the foregoing connection and torque transfer apparatus having a torque input end and a torque output end electrically insulated, and the foregoing accessory, and the accessory can be sleeved outside the axis core, and assembled into the connection and torque transfer shaft assembly having a torque input end and a torque output end electrically insulated.

Other aspect of the present disclosure provides use of the connection and torque transfer apparatus having a torque input end and a torque output end electrically insulated for connection and torque transfer.

Other aspect of the present disclosure provides use of the accessory for mounted on a screwing device for transferring a torque.

Other aspect of the present disclosure provides use of the connection and torque transfer shaft assembly having a torque input end and a torque output end electrically insulated for mounted on a screwing device for transferring a torque.

As described above, the apparatus provided in the present disclosure has the following beneficial effects:

The apparatus has fewer components, high reliability, desirable insulating performance, excellent torque transfer performance and low costs, and is simple and convenient to manufacture.

DESCRIPTION OF REFERENCE NUMERALS

1 Torque input component
101 A body of torque input component body
1011 Connecting hole
102 Torque active-transfer teeth
103 First flange
104 Concave square torque input interface
105 Torque active-transfer tenon
2 Intermediate body component
201 First tooth groove
202 Second tooth groove
203 Convex ring
204 Intermediate body mortise
205 Intermediate body tenon
3 Torque output component
301 Torque output interface
3011 Connecting protrusion
302 A body of torque output component
303 Torque passive-transfer teeth
304 Second flange
305 Torque passive-transfer mortise
306 Thrust portion
4 Input end bearing
5 Output end bearing
6 Elastic outer snap ring
7 Elastic inner snap ring
8 Housing
801 Protruding portion
802 Screw hole
803 First inspection window
804 Housing positioning groove
805 Third positioning step
806 First positioning step
9 Sleeve
901 Second inspection window
902 Flange
903 Second positioning step
10 Spring
11 Torque output head

DETAILED DESCRIPTION

Implementations of the present disclosure are described below with reference to particular specific embodiments, and a person skilled in the art can easily learn other advantages and effects of the present disclosure based on the content disclosed in this specification.

Referring to FIG. 1 to FIG. 13, it should be learned that the structure, the proportion, the size, and the like drawn in the accompanying drawings of this specification are merely used to facilitate understanding and reading of a person skilled in the art in cooperation with the content disclosed in this specification, rather than limiting the limiting conditions on which the present disclosure can be implemented, and therefore have no essential technical meanings. Any modification in the structure or a change in a proportional relationship or adjustment in the size shall fall within the scope of the technical content disclosed in the present disclosure without affecting the effect that can be generated by or the objective that can be achieved by the present disclosure. In addition, terms in this specification such as "up", "down", "left", "right", "middle", and "one" are used to make the description clear, rather than limiting the scope in which the present disclosure can be implemented, and the change or adjustment in the relative relationship made without virtually changing the technical content should also be considered as the scope in which the present disclosure can be implemented.

Figure 1:
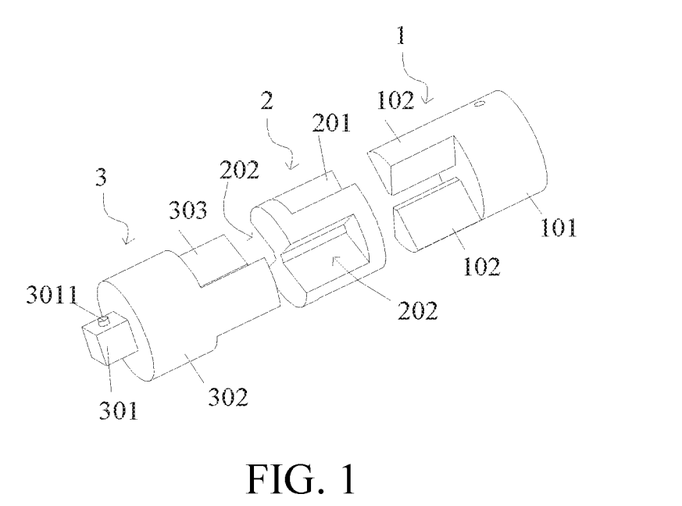
FIG. 1 shows a schematic structural diagram of a first implementation according to the present disclosure.
Figure 5:
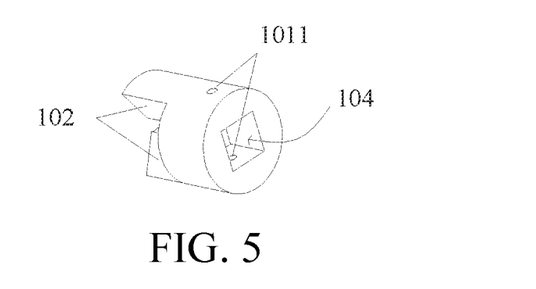
FIG. 5 shows a schematic structural diagram of a torque input component in FIG. 1.

As shown in FIG. 1 and FIG. 5, the present disclosure provides a connection and torque transfer apparatus having a torque input end and a torque output end electrically insulated, also referred to as an axis core. The connection and torque transfer apparatus includes but is not limited to: a torque input component 1, an intermediate body component 2 and a torque output component 3.

A body of the torque input component 101 is cylindrical, a concave square torque input interface 104 is disposed on a top end, and torque active-transfer teeth 102 are disposed on a bottom end. A side length of the concave square torque input interface is ¼ or ⅜ or ½ or ¾ inch or 1 inch, or certainly may be other sizes.

As shown in FIG. 5, in this embodiment, a transverse connecting hole 1011 is provided on a side wall of the concave square torque input interface. There may one or more transverse connecting holes 1011 whose main objective is to combine the concave square torque input interface with other apparatus. In this embodiment, two symmetric connecting holes 1011 are provided. For example, when an elastic connecting protrusion is disposed on other apparatus, the elastic connecting protrusion can be snapped into the connecting hole after being connected, to form a reliable connection.

In this embodiment, the concave square torque input interface is located at the center of the top end. A main objective of the concave square torque input interface is to provide an connection interface with other apparatus.

In this embodiment, a teeth surface of the torque active-transfer teeth is planar, the torque active-transfer teeth are evenly and symmetrically distributed at the bottom end of the torque input component, the torque active-transfer teeth are of a same size, there are two torque active-transfer teeth, and an arc-shaped side of the torque active-transfer teeth overlaps with a circumferential side of the body.

In other embodiment, a teeth surface of the torque active-transfer teeth may alternatively be a curved surface, for example, a concave curved surface or convex curved surface, or other linear curved cylindrical surface. The number of the torque active-transfer teeth is not limited.

A body of the torque output component 302 is cylindrical, torque passive-transfer teeth 303 are disposed on the top end, and a torque output interface 301 is disposed on the bottom end.

In this embodiment, a teeth surface of the torque passive-transfer teeth is planar, the torque passive-transfer teeth are evenly and symmetrically distributed at the top end of the torque output component, the torque passive-transfer teeth are of a same size, there are two torque passive-transfer teeth, and an arc-shaped side of the torque passive-transfer teeth overlaps with a circumferential side of the body.

In other embodiment, a teeth surface of the torque passive-transfer teeth may alternatively be a curved surface, for example, a concave curved surface or convex curved surface or other linear curved cylindrical surface. The number of the torque passive-transfer teeth is not limited.

In this embodiment, the torque output interface 301 is a tenon whose cross-section is a square, and an elastic connecting protrusion 3011 is disposed on the tenon. A function of the torque output interface, tenon whose cross-section is a square is to form a connection to other apparatus such as a bolt and nut screwing sleeve, the elastic connecting protrusion is snapped into a connecting hole of a to-be-connected apparatus after it is connected to proper position, so that the connection is more reliable.

In this embodiment, the torque output interface is located at a center of the bottom end. A main objective of the torque output interface is to provide an interface for connecting to other apparatus.

The body of the intermediate body component is cylindrical and made of an insulating material such as plastic. In this embodiment, the intermediate body component, the torque input component and the torque output component have a same diameter. Two first tooth grooves 201 into which the torque active-transfer teeth may be exactly inserted and two second tooth grooves 202 into which the torque passive-transfer teeth may be exactly inserted are disposed on two ends of the intermediate body component respectively.

In other embodiment, the diameter of the intermediate body component may be greater than the diameter of the torque input component and the diameter of the torque output component.

In this embodiment, the first tooth grooves and the second tooth grooves are not in contact with each other, and do not run through the entire intermediate body component, so that after the torque active-transfer teeth and the torque passive-transfer teeth are inserted, the torque input component and the torque output component are not in contact with each other to form electrical insulation.

In other embodiment, the first tooth grooves and the second tooth grooves are not in contact with each other, but can run through the entire intermediate body component. Provided that the length of the tooth groove is greater than the torque transfer tooth by a sufficient length, and a sufficient gap is maintained between the torque input component and the torque output component after the torque active-transfer teeth and the torque passive-transfer teeth are inserted, electrical insulating performance can be ensured.

Figure 2:
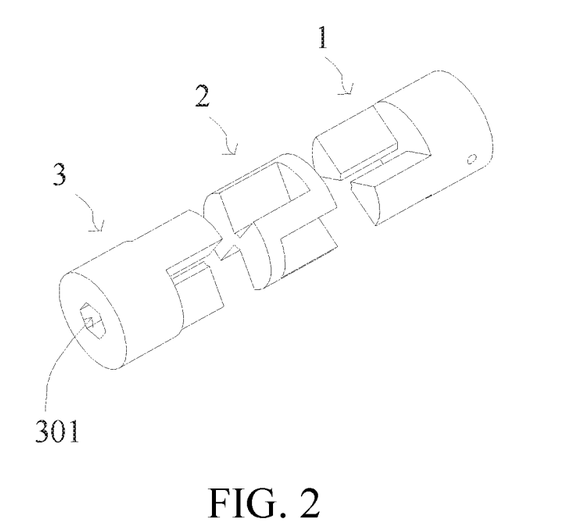
FIG. 2 shows a schematic structural diagram of a second implementation according to the present disclosure.

As shown in FIG. 2, in this embodiment, a difference from the embodiment shown in FIG. 1 is that: the torque output interface is a concave mortise whose cross-section is a regular hexagon, and a function of the torque output interface is to connect to other apparatus, for example, a torque input interface which is a bolt screwdriver set head having a tenon whose cross-section is a regular hexagon.

Figure 3:
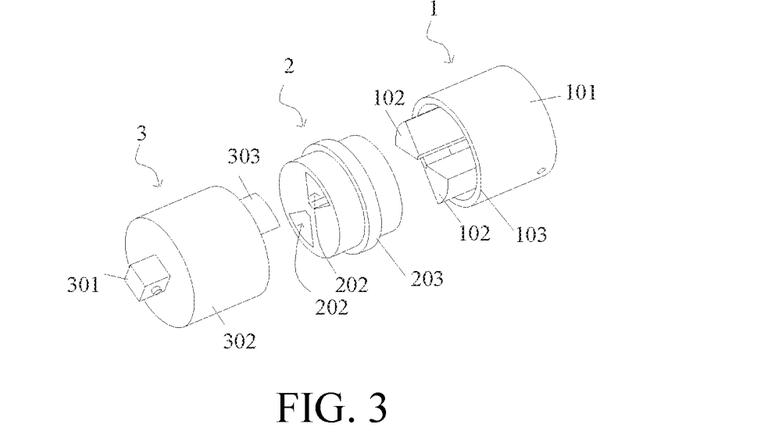
FIG. 3 shows a schematic structural diagram of a third implementation according to the present disclosure.
Figure 6:
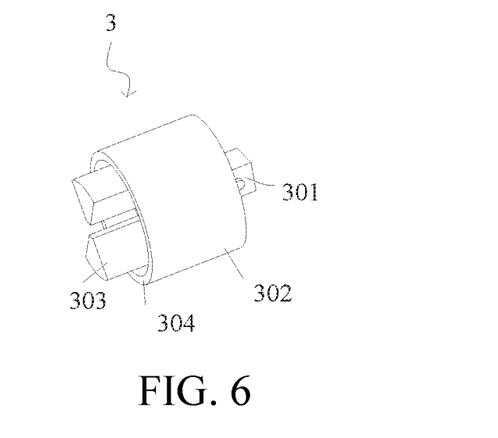
FIG. 6 shows a schematic structural diagram of a torque output component in FIG. 3.

As shown in FIG. 3 and FIG. 6, in this embodiment, a difference between the torque input component and the embodiment shown in FIG. 1 is that: a first flange 103 is disposed on the bottom end of the body of the torque input component, and the first flange surrounds a periphery of the bottom end. An objective of disposing the first flange is to provide an additional constraint for the torque passive-transfer teeth of the torque output component, reduce an amount of transformation of the torque passive-transfer teeth when a torque is transferred, and improve torque transfer performance.

In this embodiment, a different between the torque output component and the embodiment shown in FIG. 1 is that: a second flange 304 is disposed on the top end of the body of the torque output component, and the second flange 304 surrounds the periphery of the top end. An objective of disposing the second flange is to provide an additional constraint for the torque active-transfer teeth of the torque input component, reduce an amount of transformation of the torque active-transfer teeth when a torque is transferred, and improve torque transfer performance.

In this embodiment, the diameter of the intermediate body component is less than the diameter of the torque input component and the diameter of the torque output component. A convex ring 203 is disposed on the periphery of the cylindrical body of the intermediate body component, and the convex ring is annular and surrounds the cylinder. The thickness of the convex ring, the thickness of the first flange and the thickness of the second flange are the same, and the outer diameter of the convex ring, the diameter of the torque input component and the diameter of the torque output component are the same, so that after the three parts are combined into an integral entity, the entity is still a cylinder. An objective of disposing the convex ring is to ensure that the torque input component and the torque output component are reliably isolated and electrically insulated.

Figure 4:
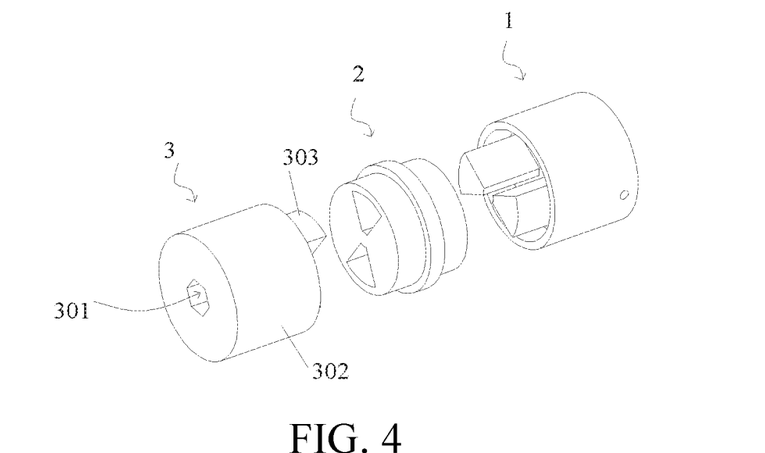
FIG. 4 shows a schematic structural diagram of a fourth implementation according to the present disclosure.

As shown in FIG. 4, in this embodiment, a difference from the embodiment shown in FIG. 3 is that: the torque output interface is a concave mortise whose cross-section is a regular hexagon, and a function of the torque output interface is to connect to other apparatus, for example, a torque input interface which is a bolt screwdriver set head having a tenon whose cross-section is a regular hexagon.

Figure 7:
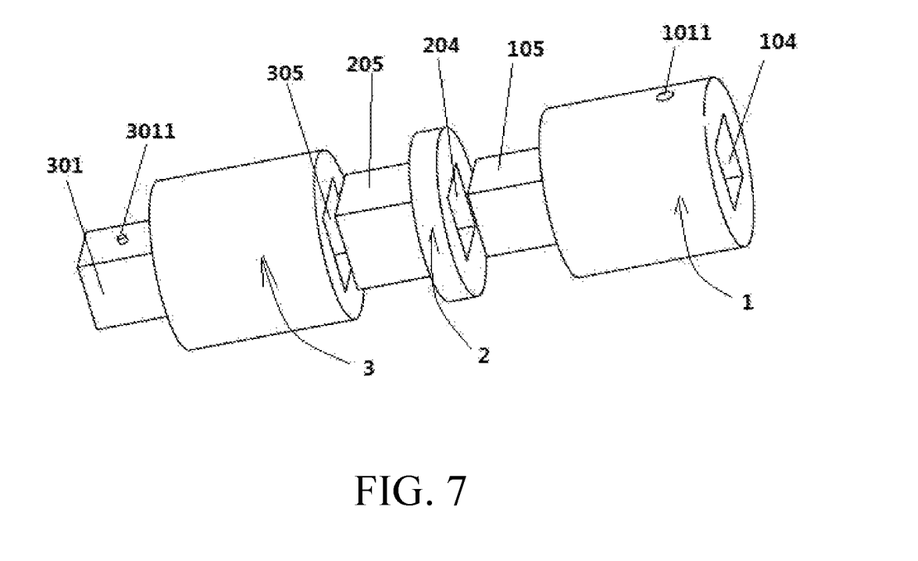
FIG. 7 shows a schematic structural diagram of a fifth implementation according to the present disclosure.

As shown in FIG. 7, in this embodiment, a difference between the embodiment shown in FIG. 1 is that: a torque active-transfer tenon whose cross-section is square is disposed on the bottom end of the torque input component, a torque passive-transfer mortise whose cross-section is square is disposed on the top end of the torque output component, an intermediate body mortise whose cross-section is square and that matches the torque active-transfer tenon and an intermediate body tenon whose cross-section is square and that matches the torque passive-transfer mortise are respectively disposed on two ends of the intermediate body component.

Figure 8:
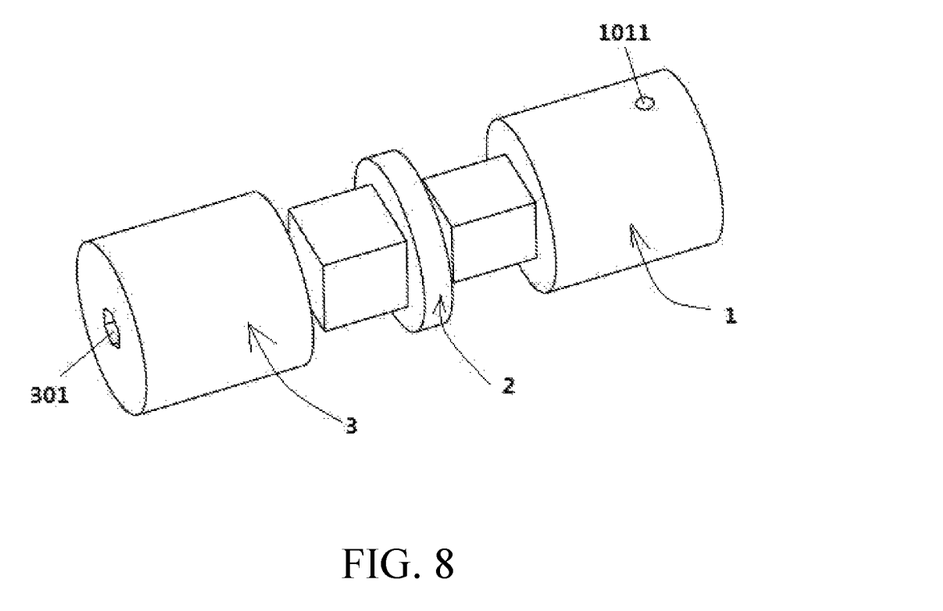
FIG. 8 shows a schematic structural diagram of a sixth implementation according to the present disclosure.

As shown in FIG. 8, in this embodiment, a difference from the embodiment shown in FIG. 7 is that: the torque output interface is a concave mortise whose cross-section is a regular hexagon, and a function of the torque output interface is to connect to other apparatus, for example, a torque input interface which is a bolt screwdriver set head having a tenon whose cross-section is a regular hexagon.

In the foregoing embodiments, an insulating layer may wrap an outer surface of the connection and torque transfer apparatus. A main function of the insulating layer is to provide further insulation protection.

In the foregoing embodiments, the torque input component 1 and the torque output component 3 may be manufactured by directly processing a metal material such as steel by using a metal cutting machine tool or by performing precision forging on a forging machine tool. In addition, a heat treatment process may further be added to further improve the strength of the material.

In the foregoing embodiments, the intermediate body component 2 may be manufactured by processing an insulating material by using a cutting machine tool, or manufactured by using a process such as injection molding, burning, or casting.

In the foregoing embodiments, the sizes of the torque input component 1, the intermediate body component 2, and the torque output component 3 may be adjusted as required.

In the foregoing embodiments, the torque input component 1, the intermediate body component 2 and the torque output component 3 are designed to be in slight interference fit and assembled through press fitting to form the apparatus assembly. Alternatively, the torque input component 1 and the torque output component 3 are manufactured and then clamped on process equipment to maintain correct postures relative to each other, the intermediate body component 2 is directly manufactured between the torque input component 1 and the torque output component 3 by using a process such as casting or injection molding, and correct assembling and reliable connection of the three components are completed at the same time.

The axis core provided in the foregoing embodiments may be used in cooperation with a handheld wired electric screwing tool in the prior art.

Figure 11:
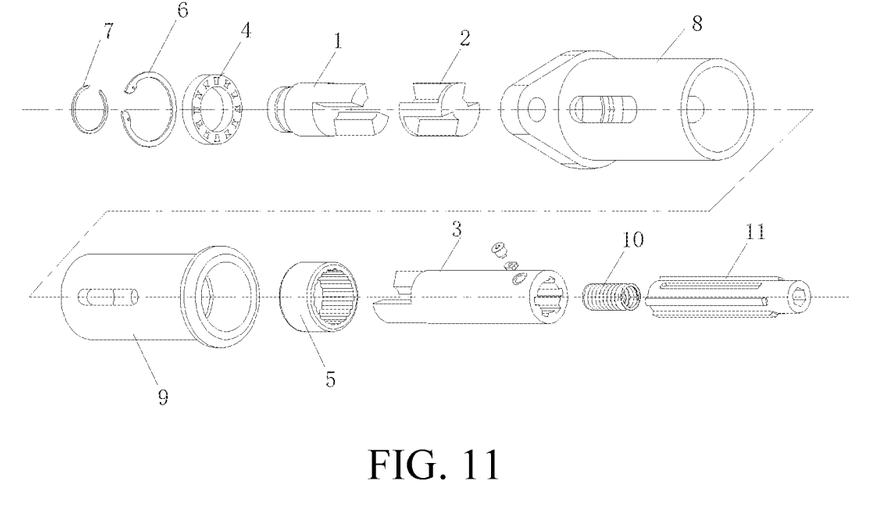
FIG. 11 shows an exploded view of an overall structure according to the present disclosure.

The present disclosure further provides an accessory. The accessory may be used by together with the axis core to jointly form a transmission shaft assembly having a torque input end and a torque output end electrically insulated (as shown in FIG. 11 to FIG. 13).

The accessory includes at least: a barrel-shaped housing 8 with two ends open and an insulating sleeve 9 with two ends open. The sleeve can be exactly sheathed in the housing. One end of the housing is a free end and the other end is a connecting and mounting end. When the sleeve is disposed in the housing, one end located in the housing is an inner end, and the other end is an outer end. The outer end is flush with the free end of the housing or protrudes from the free end. A first positioning portion is disposed in the housing, and the first positioning portion is used for positioning an external input end bearing. A second positioning portion is disposed in the sleeve, and the second positioning portion is used for positioning an external output end bearing.

A main function of the transmission shaft assembly is to fix the axis core on a screwing shaft body of a screwing machine and ensure insulation. The axis core transfers a torque of the screwing shaft to bolts and nuts that need to be screwed down. Generally, the intermediate body component 2 separates the torque input end component 1 from the torque output end component 3 to form insulation, and because the sleeve is made of an insulating material, the torque output end component of the axis core is insulated from the housing. Because the housing is connected and assembled to the screwing shaft body of the screwing machine, the screwing machine is insulated from the screwed bolts and nuts.

Figure 9:
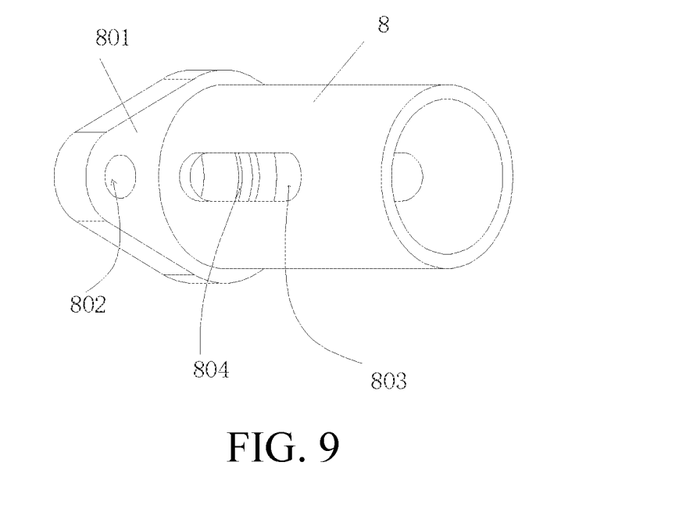
FIG. 9 shows a schematic structural diagram of a housing.
Figure 12:
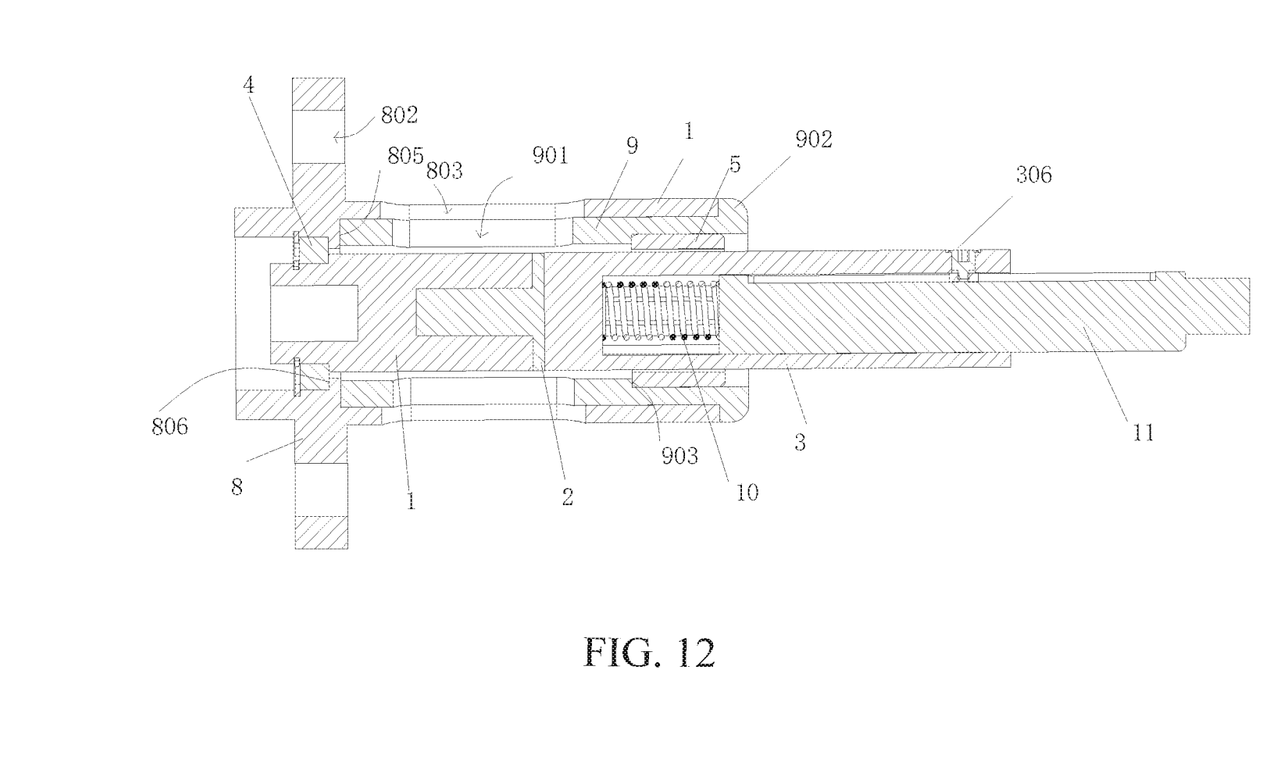
FIG. 12 shows a sectional view of an overall structure according to the present disclosure.
Figure 13:
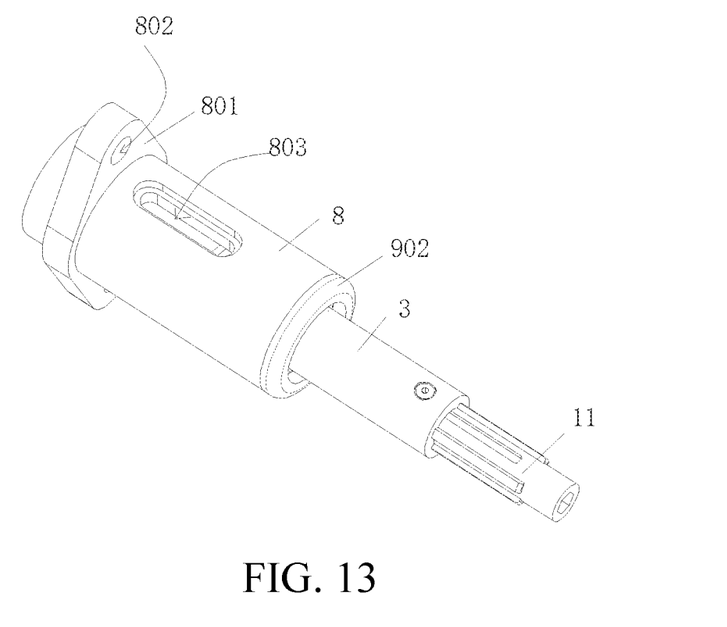
FIG. 13 shows a schematic diagram of an assembled structure according to the present disclosure.

As shown in FIG. 9 and FIG. 12, in this embodiment, the first positioning portion are a first positioning step 806 surrounding an inner wall of the housing and a housing positioning groove 804, and the external input end bearing can be exactly disposed between the first positioning step and the housing positioning groove.

In this embodiment, a third positioning portion used for positioning the sleeve is further disposed in the housing. The distance between the third positioning portion and the free end of the housing is exactly the same as the depth by which the sleeve is inserted into the housing.

As shown in FIG. 12, in this embodiment, the third positioning portion is a third positioning step 805 surrounding an inner wall of the sleeve. When the sleeve is inserted into the housing, one end of the sleeve (that is, an inner end face) exactly abuts against the third positioning step.

In other embodiments, the first positioning step and the third positioning step may use other forms, provided that an objective for positioning can be achieved. This is the same for the second positioning step in the following description.

In this embodiment, a protrusion surrounding the inner wall is formed inside the housing, and two sides of the protrusion are the first positioning step 806 and the third positioning step 805 respectively.

As shown in FIG. 9, in this embodiment, a protruding portion 801 is disposed on the connecting and mounting end of the housing, screw holes 802 are provided on the flange, and there are two screw holes. The housing may be connected to and mounted on the screwing shaft body of the screwing machine by using the flange.

As shown in FIG. 12, the second positioning portion is a second positioning step 903 surrounding an inner wall of the sleeve. When the output end bearing is mounted in the sleeve, the output end bearing exactly abuts against the second positioning step. The second positioning step is close to an outer end of the sleeve. When assembled, the output end bearing can radially support the output end component 3 of the axis core. Further, the output end bearing is in interference fit with the sleeve, and therefore does not fall off.

Figure 10:
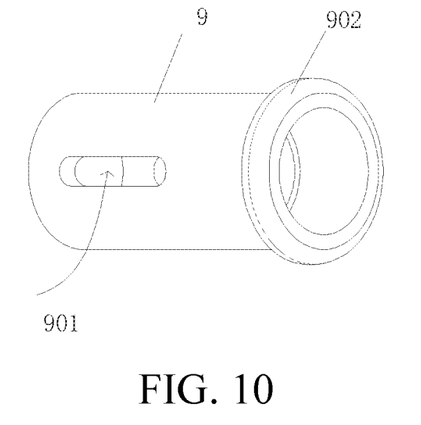
FIG. 10 shows a schematic structural diagram of a sleeve.

As shown in FIG. 10 and FIG. 12, a flange 902 is formed on an outer end face of the sleeve, and the flange completely wraps the free end of the housing. A main objective of the flange is to enable the free end of the housing to be insulated from the inner components.

As shown in FIG. 9 to FIG. 13, first inspection windows 803 are disposed on the housing. Second inspection windows 901 are disposed at corresponding positions on the sleeve. After assembled, the first inspection windows 803 and the second inspection windows 901 are located between the second positioning step and the first positioning step. There are two first inspection windows evenly distributed on the housing. There are two second inspection windows evenly distributed on the sleeve. The first inspection windows and the second inspection windows are of a same shape. A main objective of disposing the inspection windows is to enable a worker to observe the condition of the intermediate body component of the axis core, and if the intermediate body component is damaged, the intermediate body component can be replaced in time. Certainly, the shape and number of the inspection windows can be adjusted.

As shown in FIG. 11, the accessory further includes an input end bearing 4. The input end bearing can be exactly sheathed in the housing.

As shown in FIG. 11, the accessory further includes an elastic outer snap ring 6, and the elastic outer snap ring is arc-shaped. The elastic outer snap ring matches the housing positioning groove, so that the elastic outer snap ring can be exactly disposed in the housing positioning groove.

As shown in FIG. 11, in this embodiment, an elastic inner snap ring 7 is further included, and the elastic inner snap ring is arc-shaped. An axis core positioning groove is disposed on the torque input component, and the elastic inner snap ring may be exactly disposed in the axis core positioning groove.

During use, the input end bearing is first placed in the housing, the outer snap ring is placed in the housing positioning groove, the axis core is sheathed in an inner ring of the bearing, and then the inner snap ring is placed in the axis core positioning groove. In this way, the input end bearing and the axis core are fixed. Because the snap ring is made of an elastic material such as spring steel, a fixing function can be achieved by using resilience of the elastic material.

As shown in FIG. 11 and FIG. 12, the accessory further includes an output end bearing 5. The output end bearing can be exactly disposed in the sleeve.

During use, because bolts and nuts need to be screwed down by using the apparatus, the axis core needs to be rotatable. Therefore, the input end bearing and the output end bearing are configured, so that the axis core can rotate in the sleeve and the housing.

In this embodiment, the housing is made of steel.

In this embodiment, the sleeve is made of an engineering plastic of high strength such as ABS, PVC, or phenolic resin (bakelite).

In this embodiment, the wall thickness of the sleeve is 1 mm to 3 mm, and the length is 50 mm to 300 mm.

In this embodiment, the wall thickness of the housing is 3 mm to 10 mm, and the length is 50 mm to 300 mm.

FIG. 11 to FIG. 13 show schematic structural diagrams of a transmission shaft assembly formed by combining the axis core and the accessory. The shape of each portion of the axis core may vary. Provided that it can cooperate with the accessory in this application, they two can be combined in use. The torque output component may be connected to a torque output head 11 by using a spline or other torque transfer mechanism. The torque output head may directly screw down or screw down, by using a tool head connected to the torque output head, bolts and nuts that need to be screwed down. Generally, a spring 10 is disposed between the torque output head 11 and the torque output component. A thrust portion 306 is disposed on the torque output component, so that the torque output head can be prevented from falling off. Before use, the torque output head is first inserted into the torque output component, the spring is compressed, and the insertion depth is adjusted. The insertion depth is generally slightly greater than the distance by which the screwed bolts and nuts move in a screwing process.

During use, the transmission shaft assembly is mounted on the screwing machine, the depth by which the torque output head is retracted into the torque output component is adjusted, and then it can be used. In a process of screwing down the bolts and the nuts, the torque input end component transfers, by using the intermediate body component, a torque to the torque output end component and the tool head configured on the torque output head, to output the torque and screw down the bolts and the nuts. Because the entire apparatus has good insulating performance, the torque output end component and the torque input end component are completely insulated, and the screwing machine is insulated from the screwed bolts and nuts.

Therefore, the present disclosure effectively overcomes various disadvantages in the prior art and has high industrial value in use.

The foregoing embodiments are used as examples for describing the principle and effects of the present disclosure, and are not intended to limit the present disclosure. Any person skilled in the art can make modifications or variations on the foregoing embodiments without departing from the spirit and scope of the present disclosure. Therefore, all equivalent modifications or variations made by a person of ordinary skill in the technical field to which the present disclosure belongs, without departing from the spirit and technical ideas that are disclosed in the present disclosure shall still be covered by the claims of the present disclosure.

What is claimed is:

1. A connection and torque transfer apparatus having a torque input end and a torque output end electrically insulated, wherein the apparatus comprises:
   a torque input component, an intermediate body component, and a torque output component, wherein:
   a body of the torque input component is cylindrical, a concave square torque input interface is disposed on a top end, and torque active-transfer teeth or a torque active-transfer tenon is disposed on a bottom end;
   a body of the torque output component is cylindrical, torque passive-transfer teeth or a torque passive-transfer mortise is disposed on a top end, and a torque output interface is disposed on a bottom end; and a body of the intermediate body component is cylindrical and is made of an insulating material, so that the torque input component is not in contact with and is electrically insulated from the torque output component; and first tooth grooves matching the torque active-transfer teeth and second tooth grooves matching the torque passive-transfer teeth are disposed on the intermediate body component; or an intermediate body mortise matching the torque active-transfer tenon and an intermediate body tenon matching the torque passive-transfer mortise are disposed on the intermediate body component.

2. The connection and torque transfer apparatus having a torque input end and a torque output end electrically insulated according to claim 1, wherein the torque input component further comprises at least one of the following technical features:
   (1) the concave square torque input interface being located at a center of a top end of the torque input component;
   (2) a teeth surface of the torque active-transfer teeth being planar or curved;
   (3) the torque active-transfer teeth being symmetrically distributed at a bottom end of the torque input component;
   (4) the number of the torque active-transfer teeth being at least two; and
   (5) a cross-section of the torque active-transfer tenon being non-circular.

3. The connection and torque transfer apparatus having a torque input end and a torque output end electrically insulated according to claim 1, wherein a first flange is disposed on the bottom end of the body of the torque input component, and the first flange surrounds a periphery of the bottom end.

4. The connection and torque transfer apparatus having a torque input end and a torque output end electrically insulated according to claim 1, wherein the torque output component further comprises at least one of the following technical features:
   (1) the torque output interface being located at a center of a bottom end of the torque output component;
   (2) a teeth surface of the torque passive-transfer teeth being planar or curved;
   (3) the torque passive-transfer teeth being symmetrically distributed at a top end of the torque output component;
   (4) the number of the torque passive-transfer teeth being at least two; and
   (5) a cross-section of the torque passive-transfer mortise being non-circular.

5. The connection and torque transfer apparatus having a torque input end and a torque output end electrically insulated according to claim 1, wherein a second flange is disposed on the top end of the body of the torque output component, and the second flange surrounds a periphery of the top end.

6. The connection and torque transfer apparatus having a torque input end and a torque output end electrically insulated according to claim 1, wherein the diameter of the intermediate body component is less than the diameter of the torque input component and the diameter of the torque output component, a convex ring is disposed on an outer periphery of the cylindrical body of the intermediate body component, and the convex ring is annular and surrounds a circumference of the cylindrical.

7. The connection and torque transfer apparatus having a torque input end and a torque output end electrically insulated according to claim 6, wherein the outer diameter of the convex ring is the same as the diameter of the torque input component and the diameter of the torque output component.

8. An accessory matching the connection and torque transfer apparatus having a torque input end and a torque output end electrically insulated according to claim 1, wherein the accessory further comprises:
   a barrel-shaped housing with two ends open and an insulating sleeve with two ends open, wherein:
   the sleeve can be exactly sheathed in the housing;
   one end of the housing is a free end and the other end is a connecting and mounting end; when the sleeve is disposed in the housing, one end located in the housing is an inner end, and the other end is an outer end; and the outer end is flush with the free end of the housing or protrudes from the free end;
   a first positioning portion is disposed in the housing, and the first positioning portion is used for positioning an external input end bearing; and
   a second positioning portion is disposed in the sleeve, and the second positioning portion is used for positioning an external output end bearing.

9. The accessory according to claim 8, wherein the connection and torque transfer apparatus formed by the torque input component, the intermediate body component, and the torque output component can be exactly disposed in the accessory as an axis core.

10. The accessory according to claim 8, wherein the first positioning portion comprises a first positioning step surrounding an inner wall of the housing and a housing positioning groove, and the external input end bearing can be exactly disposed between the first positioning step and the housing positioning groove.

11. The accessory according to claim 8, wherein the second positioning portion is a second positioning step surrounding an inner wall of the sleeve.

12. The accessory according to claim 8, wherein a third positioning portion used for positioning the sleeve is further disposed in the housing.

13. The accessory according to claim 8, wherein a protruding portion is disposed on the connecting and mounting end of the housing, and a screw hole is provided on the protruding portion.

14. The accessory according to claim 8, wherein a flange is formed on an outer end face of the sleeve, and the flange completely wraps the free end of the housing.

15. The accessory according to claim 8, wherein the accessory further comprises an input end bearing, and the input end bearing can be exactly sheathed in the housing.

16. The accessory according to claim 8, wherein the accessory further comprises an elastic outer snap ring and an elastic inner snap ring, the elastic outer snap ring matches the housing positioning groove, an axis core positioning groove surrounding the torque input component is disposed on the torque input component, and the elastic inner snap ring matches the axis core positioning groove.

17. The accessory according to claim 8, wherein the accessory further comprises an output end bearing, and the output end bearing can be sheathed in the sleeve.

18. The accessory according to claim 8, wherein first inspection windows are disposed on the housing; and second inspection windows are disposed at corresponding positions on the sleeve.

19. Use of the accessory according to claim 8 mounted on a screwing device for transferring a torque.

20. A connection and torque transfer shaft assembly having a torque input end and a torque output end electrically insulated, wherein the assembly comprises the connection and torque transfer apparatus having a torque input end and a torque output end electrically insulated according to claim 1 and the accessory according to claim 8, the accessory can be sleeved outside the connection and torque transfer apparatus having a torque input end and a torque output end electrically insulated, and assembled into the connection and torque transfer shaft assembly having a torque input end and a torque output end electrically insulated.

21. Use of the connection and torque transfer shaft assembly having a torque input end and a torque output end electrically insulated according to claim 20 mounted on a screwing device for transferring a torque.

22. Use of the connection and torque transfer apparatus having a torque input end and a torque output end electrically insulated according to claim 1 for connection and torque transfer.

\* \* \* \* \*